United States Patent [19]

Schaulin et al.

[11] Patent Number: 5,328,995
[45] Date of Patent: Jul. 12, 1994

[54] AZO DYES CONTAINING TRIAZINE MIDDLE COMPONENTS AND A 1,4-PHENYLENE-2,5-DISUBSTITUTED COUPLING COMPONENT

[75] Inventors: Rudolf Schaulin, Riehen; Urs Lauk, Zurich, both of Switzerland

[73] Assignee: Ciba-Geigy Corporation, Ardsley, N.Y.

[21] Appl. No.: 9,427

[22] Filed: Jan. 27, 1993

Related U.S. Application Data

[63] Continuation of Ser. No. 722,590, Jun. 27, 1991, abandoned.

[30] Foreign Application Priority Data

Jul. 2, 1990 [CH] Switzerland ............... 2195/90

[51] Int. Cl.$^5$ ............ C09B 62/09; C09B 43/16; D06P 3/62; D06P 3/04
[52] U.S. Cl. ............... 534/797; 534/605; 534/606; 534/612; 534/631; 534/635; 534/636; 534/637; 534/691; 534/756; 534/764; 534/796
[58] Field of Search ............ 534/605, 606, 612, 634, 534/635, 636, 691, 756, 796, 797, 637

[56] References Cited

U.S. PATENT DOCUMENTS

| | | | |
|---|---|---|---|
| 3,945,990 | 3/1976 | Ikeda et al. | 534/797 |
| 4,082,739 | 4/1978 | Seitz | 534/634 |
| 4,453,945 | 1/1984 | Miyamoto et al. | 534/612 X |
| 4,474,696 | 10/1984 | Takahashi | 534/637 |
| 4,605,442 | 8/1986 | Kawashita et al. | 534/797 X |
| 4,866,163 | 9/1989 | Koch | 534/797 X |
| 4,997,919 | 3/1991 | Schaulin | 534/637 |
| 5,006,128 | 4/1991 | Pedrazzi | 8/437 |
| 5,149,790 | 9/1992 | Taylor | 534/634 |

FOREIGN PATENT DOCUMENTS

| | | |
|---|---|---|
| 0168961 | 1/1986 | European Pat. Off. |
| 0256650 | 2/1988 | European Pat. Off. |
| 0348344 | 12/1989 | European Pat. Off. |
| 3828909 | 3/1990 | Fed. Rep. of Germany |
| 2228822 | 12/1974 | France |
| 57-102972 | 6/1982 | Japan |
| 62-250059 | 10/1987 | Japan ............... 534/797 |
| 02-294369 | 12/1990 | Japan |
| 292293 | 1/1971 | U.S.S.R. ............... 534/637 |
| 1017271 | 1/1966 | United Kingdom ............... 534/634 |
| 1439801 | 6/1976 | United Kingdom |
| 2036780 | 7/1980 | United Kingdom |

OTHER PUBLICATIONS

Dye Industry, vol. 39, No. 8 (1991) Chemical Abstracts, 93:27939v (1980).
Chemical Abstracts, 97:111284t (1982).
Chemical Abstracts, 114:209454t (1991).

*Primary Examiner*—Mary C. Lee
*Assistant Examiner*—Fiona T. Powers
*Attorney, Agent, or Firm*—Kevin T. Mansfield; Edward McC. Roberts

[57] ABSTRACT

The compounds of the formula

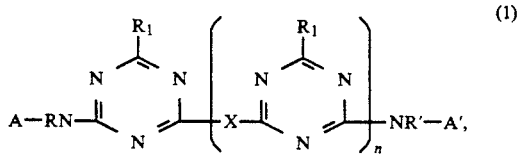

where the substituents are as defined in claim 1, are direct dyes for various substrates, in particular cellulosic fibre materials. They are high temperature resistant and therefore are particularly highly suitable for the one-bath, single-stage dyeing of polyester/cotton blend fabrics with a disperse dye for the polyester fibres under the dyeing conditions for polyester fibres.

15 Claims, No Drawings

AZO DYES CONTAINING TRIAZINE MIDDLE COMPONENTS AND A 1,4-PHENYLENE-2,5-DISUBSTITUTED COUPLING COMPONENT

This application is a continuation of application Ser. No. 07/722,590, filed Jun. 27, 1991, abandoned.

The present invention relates to novel azo dyes, processes for the preparation thereof and the use thereof for dyeing and printing fibre materials, in particular textile fibre materials.

The present invention accordingly provides compounds of the formula

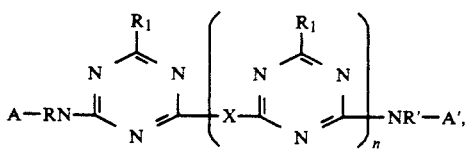

where
A is a radical of the formula

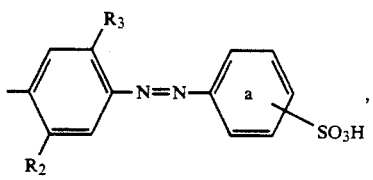

A' has the meaning A or is a radical of the formula

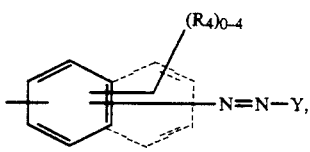

R and R' are each independently of the other hydrogen or substituted or unsubstituted $C_1-C_4$alkyl, $R_1$ is hydroxyl, $C_1-C_4$alkoxy, chlorine, bromine, $C_1-C_4$alkylthio, amino, unsubstituted or hydroxyl-, sulfo-, carboxyl- or $C_1-C_4$alkoxy-substituted (in the alkyl moiety) N-mono- or N,N-di-$C_1-C_4$alkylamino, cyclohexylamino, unsubstituted or $C_1-C_4$alkyl-, $C_1-C_4$alkoxy-, carboxyl-, sulfo- and/or halogen-substituted (in the phenyl moiety) phenylamino or N-$C_1-C_4$alkyl-N-phenylamino, morpholino or 3-carboxy- or 3-carbamoyl-pyridin-1-yl, X is a bridge member, n is 0 or 1, $R_2$ and $R_3$ are each independently of the other $C_1-C_4$alkyl, $C_1-C_4$alkoxy, sulfo, chlorine, hydroxyl, carboxyl or unsubstituted or hydroxyl-substituted (in the alkyl moiety) $C_2-C_4$alkanoylamino, the phenyl radical (a) may be further substituted, $(R_4)_{0-4}$ represents from 0 to 4 identical or different radicals selected from the group consisting of $C_1-C_4$alkyl, $C_1-C_4$alkoxy, sulfo, chlorine, carboxyl and hydroxyl, and Y is phenyl which may be further substituted or the radical of a 1-phenylpyrazol-5-one or of a 6-hydroxypyrid-2-one.

The substituents R and R', which are identical or different, are each hydrogen or unsubstituted or for example chlorine-, hydroxyl-, cyano-, carboxyl-, sulfo-, sulfato-, methoxy-, ethoxy-, methoxycarbonyl- or ethoxycarbonyl-substituted $C_1-C_4$alkyl. The term sulfo includes in general not only the free acid form (—$SO_3H$) but also the salt form in which case in particular alkali metal salts (Li, Na, K) or ammonium salts come into consideration.

Examples of suitable substituents R and R' are $C_1-C_4$alkyl, which encompasses in general methyl, ethyl, n-propyl, isopropyl, n-butyl, isobutyl, sec-butyl and tert-butyl; carboxymethyl, β-carboxyethyl, methoxycarbonylmethyl, ethoxycarbonylmethyl, β-methoxyethyl, β-ethoxyethyl, β-chloroethyl, γ-chloropropyl, β-hydroxyethyl, β-hydroxybutyl, β-cyanoethyl, sulfomethyl, β-sulfoethyl and β-sulfatoethyl.

R and R' are each independently of the other preferably methyl or ethyl and particularly preferably hydrogen.

A $C_1-C_4$alkoxy $R_1$ has the general meaning of methoxy, ethoxy, n-propoxy, isopropyxy, n-butoxy, isobutoxy, sec-butoxy or tert-butoxy.

$R_1$ is preferably hydroxyl, $C_1-C_3$alkoxy, $C_1-C_2$alkylthio, amino, unsubstituted or hydroxyl-, carboxyl-, sulfo-, methoxy- or ethoxy-substituted (in the alkyl moiety) N-mono- or N,N-di-$C_1-C_4$alkylamino, unsubstituted or chlorine-, methyl-, methoxy-, carboxyl- and/or sulfo-substituted (in the phenyl moiety) phenylamino, N-$C_1-C_4$alkyl-N-phenylamino or morpholino.

Examples of preferred $R_1$ are thus hydroxyl, methoxy, ethoxy, n-propoxy, isopropoxy, methylthio, ethylthio, amino, methylamino, ethylamino, carboxymethylamino, β-hydroxyethylamino, N,N-di-β-hydroxyethylamino, β-sulfoethylamino, phenylamino, o-, m- or p-methylphenylamino, o-, m- or p-methoxyphenylamino, o-, m- or p-chlorophenylamino, o-, m- or p-sulfophenylamino, 2,4- or 2,5-disulfophenylamino, o-carboxyphenylamino, N-ethyl-N-phenylamino, N-methyl-N-phenylamino and morpholino.

Particularly preferred meanings of $R_1$ are unsubstituted or carboxyl-, hydroxyl- or methoxy-substituted (in the alkyl moiety) N-mono- or N,N-di-$C_1-C_2$alkylamino, morpholino, ethylthio, phenylamino and o-, m- or p-sulfophenylamino.

A particularly preferred embodiment of the present invention concerns compounds of the afore-indicated formula (1) where $R_1$ is N-β-hydroxyethylamino, N,N-di-β-hydroxyethylamino or morpholino.

Suitable bridge members X conform for example to the formula

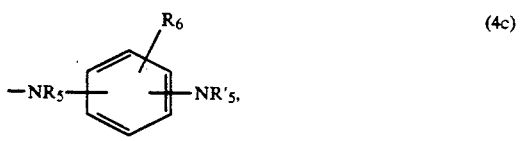

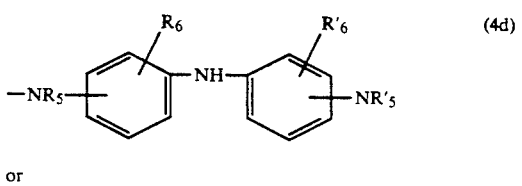

or

-continued

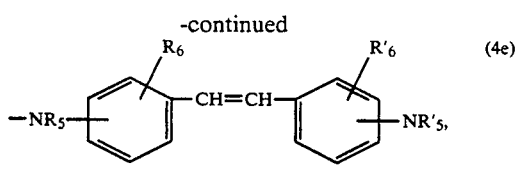

where $R_5$ and $R'_5$ are each independently of the other subject to the definitions and preferences expressed above for R and R', $R_6$ and $R'_6$ are each independently of the other hydrogen, sulfo, methyl, methoxy or chlorine, and alk is a $C_1$-$C_6$alkylene radical, for example a methylene, ethylene, 1,2-propylene, 1,3-propylene, 1,4-butylene, 1,5-pentylene or 1,6-hexylene radical or a branched isomer thereof.

The radical alk in the formula (4a) is preferably a $C_2$-$C_4$alkylene radical. $R_6$ and/or $R'_6$ in the formulae (4c), (4d) and (4e) are each independently of the other preferably hydrogen or sulfo.

The preferred bridge members X conform to the formulae

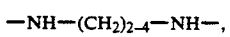 (4a')

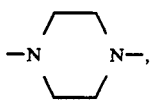 (4b)

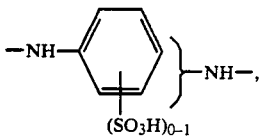 (4c')

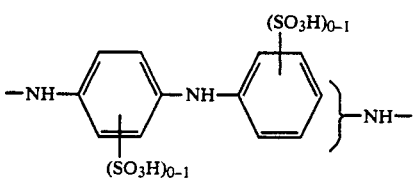 (4d')

or

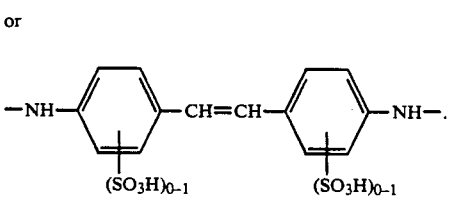 (4e')

When n in the formula (1) is 1, A and A' and R and R' are preferably each identical.

Variable n in the formula (1) is 1 or preferably 0.

When $R_2$ or $R_3$ in the formula (2) is a $C_2$-$C_4$alkanoylamino radical it is for example an unsubstituted or hydroxyl-substituted acetylamino, propionylamino or butyrylamino radical and preferably an unsubstituted or hydroxyl-substituted $C_2$-$C_3$alkanoylamino radical. Examples of suitable alkanoylamino radicals $R_2$ and $R_3$ are acetylamino, n-propionylamino, isopropionylamino, hydroxyacetylamino and 2- or 3-hydroxypropionylamino, of which meanings acetylamino and hydroxyacetylamino are particularly preferred.

$R_2$ and/or $R_3$ are each independently of the other preferably methyl, ethyl, methoxy, ethoxy, sulfo, hydroxyl, chlorine, carboxyl, acetylamino, propionylamino or hydroxyacetylamino.

Particularly preferred meanings of $R_2$ and $R_3$ are independently of each other methyl, methoxy, sulfo and acetylamino.

A particularly preferred embodiment of the present invention concerns compounds of the formula (1) where $R_2$ is methoxy and $R_3$ is methyl.

The phenyl radical (a) may be further substituted for example by one or more identical or different substituents selected from the group consisting of $C_1$-$C_4$alkyl, $C_1$-$C_4$alkoxy, halogen, hydroxyl, carboxyl, sulfo, unsubstituted or hydroxyl-substituted $C_2$-$C_4$alkanoylamino and arylazo.

Examples of halogen substituents are in general bromine, fluorine and in particular chlorine.

Suitable arylazo substituents on the phenyl radical (a) are for example a 1- or 2-naphthylazo radical or preferably a phenylazo radical, which radical may each be unsubstituted or for example further substituted by sulfo, $C_1$-$C_4$alkyl, $C_1$-$C_4$alkoxy, hydroxyl and/or halogen. When the phenyl radical (a) is substituted by an arylazo radical it is preferably an unsubstituted or sulfo-, methyl-, methoxy- and/or chlorine-substituted phenylazo radical.

The phenyl radical (a) preferably carries no further substituents or is substituted by one or more substituents selected from the group consisting of $C_1$-$C_4$alkyl, $C_1$-$C_4$alkoxy, chlorine, hydroxyl, carboxyl, $C_2$-$C_3$alkanoylamino and unsubstituted or sulfo-, methyl-, methoxy- and/or chlorine-substituted phenylazo.

Particularly preferably the phenyl radical (a) carries no further substituents or is further monosubstituted by methyl, methoxy, acetylamino or chlorine.

$(R_4)_{0-4}$ in the formula (3) preferably represents from 0 to 4 identical or different radicals selected from the group consisting of methyl, methoxy, chlorine, hydroxyl, carboxyl and sulfo.

Examples of suitable substituents on the radical Y are: $C_1$-$C_4$alkyl, $C_1$-$C_4$alkoxy; $C_1$-$C_4$alkoxy-$C_1$-$C_4$alkyl, e.g. methoxymethyl, ethoxymethyl, n-propoxymethyl, isopropoxymethyl, n-butoxymethyl, ethoxyethyl, n-butoxyethyl, ethoxy, butoxypropyl or methoxybutyl; unsubstituted or hydroxyl-substituted $C_2$-$C_4$alkanoylamino, e.g. acetylamino, propionylamino or hydroxyacetylamino; benzoylamino; amino; unsubstituted or —OH, —OCOCH$_3$, —OSO$_3$H, —CN or halogen-substituted (in the alkyl moiety) N-mono- or N,N-di-$C_1$-$C_4$alkylamino, e.g. methylamino, ethylamino, n-propylamino, isopropylamino, n-butylamino, sec-butylamino, isobutylamino, tert-butylamino, N,N-di-$\beta$-hydroxyethylamino, N,N-di-$\beta$-sulfatoethylamino, hydroxypropylamino, $\beta$-sulfatoethylamino, $\beta$-chloroethylamino, $\beta$-acetyloxyethylamino; phenylamino; mono- or di-sulfobenzylamino; $C_1$-$C_4$alkoxycarbonyl, e.g. methoxycarbonyl or ethoxycarbonyl; $C_1$-$C_4$alkylsulfonyl, e.g. methylsulfonyl or ethylsulfonyl; phenylsulfonyloxy; trifluoromethyl; nitro; cyano; halogen; carbamoyl; N-mono- or N,N-di-$C_1$-$C_4$alkylcarbamoyl; sulfamoyl; N-mono- or N,N-di-$C_1$-$C_4$alkylsulfamoyl; N-($\beta$-hydroxyethyl)sulfamoyl; N,N-di($\beta$-hydroxyethyl)sulfamoyl; N-phenylsulfamoyl; hyrdoxyl; carboxyl; sulfo; sulfomethyl; ureido; unsubstituted or for example sulfo-, $C_1$-$C_4$alkyl-, $C_1$-$C_4$alkoxy-, hydroxyl- and/or halogen-substituted phenylazo.

A', where not having the meaning A, preferably conforms to the formula

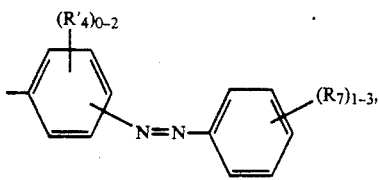

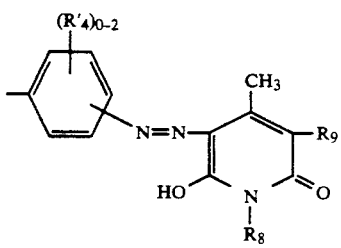

or

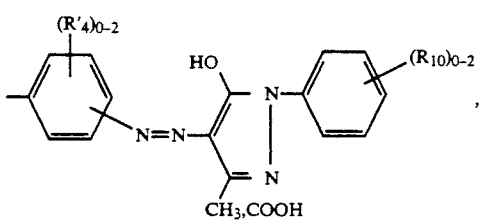

where $(R'_4)_{0-2}$ represents from 0 to 2 identical or different radicals selected from the group consisting of methyl, methoxy, sulfo, chlorine, hydroxyl and carboxyl, $(R_7)_{1-3}$ represents from 1 to 3 identical or different substituents selected from the group consisting of sulfo, methyl, methoxy, chlorine, hydroxyl, carboxyl and o-, m- or p-sulfophenylazo, $R_8$ is hydrogen, $C_1$-$C_4$alkyl or $C_1$-$C_4$alkoxy-$C_1$-$C_4$alkyl, $R_9$ is sulfomethyl, cyano or carbamoyl, and $(R_{10})_{0-2}$ represents from 0 to 2 identical or different radicals selected from the group consisting of methyl, methoxy, sulfo, hydroxyl, amino, acetylamino and hydroxyacetylamino. Other possibilities include metal complexes of the aforementioned radicals A′, for example the corresponding copper complexes.

A particularly preferred embodiment of the present invention concerns symmetrical compounds of the afore-indicated formula (1) where n is 0 and A and A′ and R and R′ are each identical.

Good dyeing results are obtained in particular with compounds of the formula

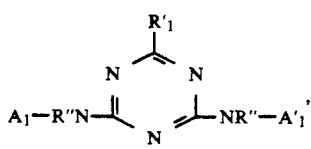

(1a)

where R″ is hydrogen, methyl or ethyl, R′$_1$ is hydroxyl, $C_1$-$C_3$alkoxy, $C_1$-$C_2$alkylthio, amino, unsubstituted or hydroxyl-, carboxyl-, sulfo-, methoxy- or ethoxy-substituted (in the alkyl moiety) N-mono- or N,N-di-$C_1$-$C_4$alkylamino, unsubstituted or methoxy-, methyl-, chlorine-, carboxyl- and/or sulfo-substituted (in the phenyl moiety) phenylamino, N-$C_1$-$C_4$alkyl-N-phenylamino or morpholino, A$_1$ is a radical of the formula

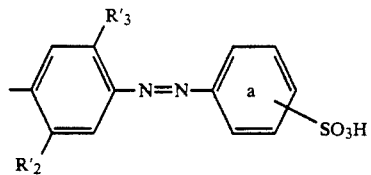

(2a)

where R′$_2$ and R′$_3$ are each independently of the other methyl, ethyl, methoxy, ethoxy, sulfo, hydroxyl, chlorine, carboxyl, acetylamino, propionylamino or hydroxyacetylamino, and the phenyl radical (a) is unsubstituted or further substituted by $C_1$-$C_4$alkyl, $C_1$-$C_4$alkoxy, halogen, hydroxyl, carboxyl, sulfo, unsubstituted or hydroxyl-substituted $C_2$-$C_4$alkanoylamino and/or arylazo, and A′$_1$ is a radical of the formula

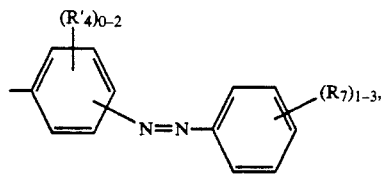

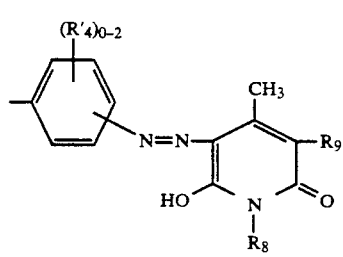

or

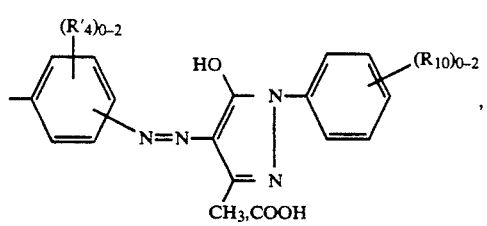

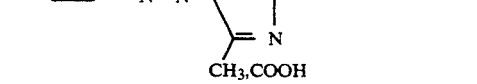

where $(R'_4)_{0-2}$, $(R_7)_{1-3}$, $R_8$, $R_9$ and $(R_{10})_{0-2}$ are each as defined above, or preferably has the meaning A$_1$.

Particularly good dyeings are obtained with the compounds of the formula

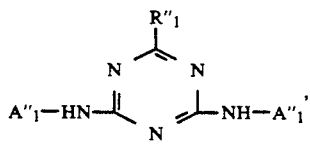

(1b)

where R″$_1$ is unsubstituted or carboxyl-, hydroxyl- or methoxy-substituted (in the alkyl moiety) N-mono- or N,N-di-$C_1$-$C_2$alkylamino, morpholino, ethylthio, phenylamino or o-, m- or p-sulfophenylamino, and A″$_1$ is a radical of the formula

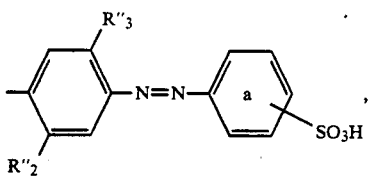 (2b)

where R''₂ and R''₃ are each independently of the other methyl, methoxy, sulfo or acetylamino, and the phenyl radical (a) is unsubstituted or further substituted by $C_1-C_4$alkyl, $C_1-C_4$alkoxy, chlorine, hydroxyl, carboxyl, $C_2-C_3$alkanoylamino and/or unsubstituted or sulfo-, methyl-, methoxy- and/or chlorine-substituted phenylazo.

A particularly preferred embodiment of the present invention concerns compounds of the formula

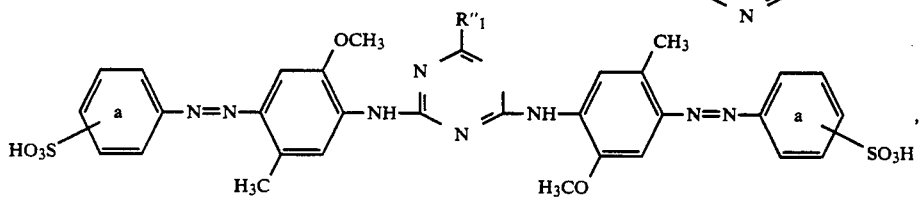

where R''₁ is N-β-hydroxyethylamino, N,N-di-β-hydroxyethylamino or morpholino, and the phenyl radical is unsubstituted or further substituted by methyl, methoxy, acetylamino or chlorine.

The process for preparing the compounds of the afore-indicated formula (1) where n is 0 comprises reacting a compound of the formula

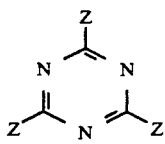 (5)

in succession in any desired order with a compound of the formula

 A-NHR (6), a compound of the formula
 A'-NHR' (7)

and a compound of the formula

 R₁-H (8)

where A,A',R,R' and R₁ are each as defined above and Z is halogen, preferably chlorine.

Preferably, the trihalotriazine compound of the formula (5) is reacted first in approximately stoichiometric amounts with an aminoazo compound of the formula (6) at a temperature of from −5° to 20° C., preferably from 0° to 5° C., while the pH is kept neutral or slightly acidic, preferably at from 5 to 7, by addition of suitable bases, for example ammonium or alkali metal bases such as ammonia, lithium hydroxide, sodium hydroxide, potassium hydroxide, lithium carbonate, sodium carbonate or potassium carbonate. To the reaction mixture obtained is then added, advantageously in approximately stoichiometric amounts, an aminoazo compound of the formula (7), which is made to react with the triazine derivative at a slightly elevated temperature, preferably at from 30° to 50° C., and at a neutral or slightly acid pH, preferably pH 6–7. If the compounds of the formulae (6) and (7) are identical aminoazo compounds, about 2 equivalents of this aminoazo dye are reacted with 1 equivalent of triazine compound, preferably at a temperature which is initially maintained at from −5° to 20° C. and then raised to about 30°–50° C.

A further possibility comprises reacting the triazine compound of the formula (5) with a mixture containing not only a compound of the formula (6) but also a nonidentical compound of the formula (7), in which case a mixture of an asymmetrical compound of the formula

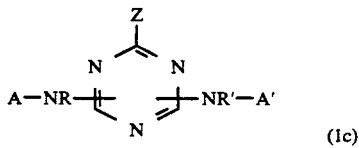 (1c)

and two symmetrical compounds of the formulae

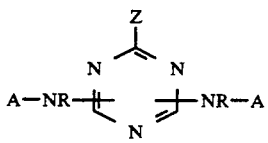

and

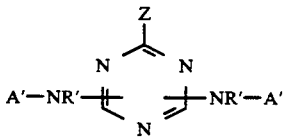

is obtained.

The triazinyl dyes obtainable from the above-described processes still contain a halogen atom Z, which by reaction with a compound of the formula (8) at elevated temperature, preferably at from 70° to 100° C., and at a neutral or slightly alkaline pH, ranging for example from 7 to 9 depending on the compound of the formula (8) used, can be converted into any desired group R₁.

The compounds of the afore-indicated formula (1) where n is 1 are prepared, for example, by a) reacting independently of one another a compound of the formula

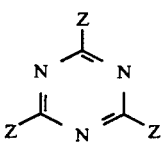 (5)

with a compound of the formula

   (6)

to give a compound of the formula

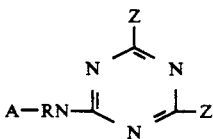   (9)

and a further compound of the formula (5) with a compound of the formula

   (7)

to give a compound of the formula

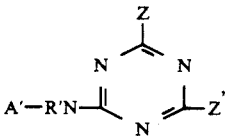   (9a)

b) reacting a compound of the formula

H-X-H   (10)

in succession in any desired order with the compounds of the formulae (9) and (9a) obtainable as per a), and c) reacting the compound of the formula

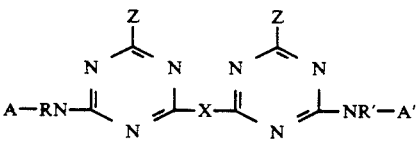   (11)

obtainable as per b) with a compound of the formula

   (8)

where A, A', R, R', $R_1$ and X are each as defined above and Z is halogen, preferably chlorine.

The reaction of the compound of the formula (5) with the compound of the formula (6) or (7) as per step a) is here advantageously carried out as described above.

The successive reactions of the compound of the formula (10) with the compounds of the formulae (9) and (9a) obtained as per a) are preferably carried out at a slightly elevated temperature, advantageously for example at from 30° to 50° C., and at a neutral or slightly acid pH, ranging for example from 6 to 7, and it is advantageous to use approximately stoichiometric amounts of the compounds (9), (9a) and (10). If the compounds of the formulae (6) and (7) are identical aminoazo compounds, it is advantageous first to prepare 2 mole equivalents of the compound of the formula (9) and to react them with about 1 mole equivalent of a compound of the formula (10). The compounds of the formula (11) obtainable as per b) still contain 2 halogen atoms Z, which can advantageously be converted into any desired group $R_1$ as described above.

The present invention further provides for the use of the azo dyes of the formula (1), alone or mixed, for dyeing or printing nitrogen-containing and in particular hydroxyl-containing fibre materials.

The azo dyes of the formula (1) of the present invention are thus suitable for dyeing and printing nitrogen-containing or in particular cellulosic fibre materials, preferably textile fibre materials, made of silk, wool or synthetic polyamides, and preferably made of the cellulosic fibres, such as rayon, cotton or hemp.

As regards their dyeing properties, they can be considered direct-dyeing dyes or direct dyes within the meaning of the Colour Index.

Similarly, textile fibre materials made of fibre blends, for example wool/cotton, polyamide/cotton, acrylic/cotton or in particular polyester/cotton fibre blends, can be dyed by single-bath methods and in the presence of dyes for the other fibre type.

The textile fibre materials can be present in a wide range of possible processing forms, for example as fibre, yarn, woven fabric or knitted fabric.

As well as textile substrates it is also possible to dye leather and paper with the compounds (dyes) of the formula (1) of the present invention.

Level dyeings are obtained in yellow shades which have good all round fastness properties, in particular good rub, wet, wet rub, perspiration and light fastness properties. If necessary, the wet fastness properties, in particular the wash fastness, of the direct dyeings and prints obtained can be significantly improved by an aftertreatment with so-called fixatives.

The dyes of the formula (1) according to the present invention are highly compatible with other dyes, in particular disperse dyes. The dyes of the present invention possess adequate high temperature stability and thus can be dyed from an aqueous liquor and at a pH of from 4 to 7.5, preferably from 5 to 7, under the dyeing conditions for polyester fibres, i.e. at temperatures within the range from about 100° to 150° C., preferably from 110° to 130° C.

This makes it possible to use customary disperse dyes together with the dyes of the formula (1) according to the present invention in a single-stage, single-bath process for dyeing polyester/cotton blends (blend fabrics) in which both kinds of fibre are dyed uniformly and with a fast result by the appropriate dye. If a disperse dye of the same shade as the dye of the present invention is used, it is also possible to obtain a solid shade dyeing.

The dyes of the formula (1) of the present invention significantly simplify the dyeing of textile fibre blends (blend fabrics), for example those of polyester and cellulose fibres: it is no longer necessary to dye each component of the fibre blend separately under different dyeing conditions.

The compounds of the formula (1) according to the present invention are also suitable for preparing aqueous inks for ink-jet printing.

The Examples which follow serve to illustrate the invention. Parts and percentages are by weight, unless otherwise stated. Parts by weight bear the same relation to parts by volume as the kilogram to the liter. The temperatures are given in degrees Celsius.

EXAMPLE 1

17.3 parts of 1-aminobenzene-3-sulfonic acid are suspended in 100 parts of ice-water and 22 parts of concentrated HCl and diazotised at from 0° to 5° C. with 7 parts of sodium nitrite, dissolved in 20 parts of water. The excess nitrite is then destroyed with sulfamic acid.

The solution of the diazo compound thus prepared is then added to a solution of 14.2 parts of 3-amino-4-methoxytoluene in 120 parts of ice-water and 20 ml of concentrated HCl where the pH is maintained at from 4.5 to 5.0 with sodium acetate. The mixture is subsequently stirred at 5°-10° C. for 2 hours and the aminoazo dye is then filtered off; it is then washed with 20% sodium chloride solution and dried. 25.7 parts of the crude aminoazo compound thus obtained are then suspended in 300 parts of water, the suspension is cooled down to about 5° C. and brought to pH 7 with sodium hydroxide solution and is then added to a suspension of 7.4 parts of cyanuric chloride and 100 parts of ice-water. The mixture is stirred at from 0° to 10° C. for 2 hours, then warmed to 40° C. and subsequently stirred at from 40° to 50° C. for 5 hours. Throughout the entire stirring time the pH is maintained at from 6.5 to 7 with sodium hydroxide solution. The product is salted out with sodium chloride, filtered off, washed with sodium chloride solution and dried. It comprises the dye which in the form of the free acid conforms to the formula

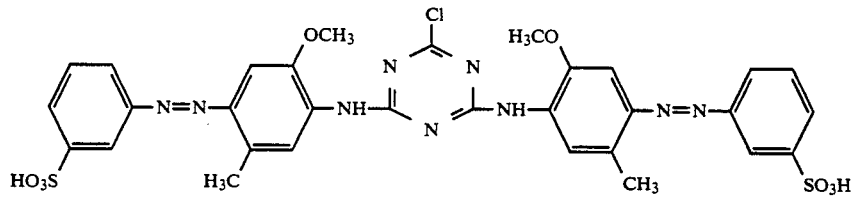

and dyes cotton in pure greenish yellow shades which have good light and wet fastness properties.

EXAMPLE 2

10 parts of the dye obtained as described in Example 1 are stirred with 1.2 parts of ethanolamine and 250 parts of water at a temperature of from 90° to 95° C. for about 6 hours during which the pH is maintained at 7.5 with sodium hydroxide solution. The product is subsequently salted out, filtered off and dried; it conforms in the form of the free acid to the formula

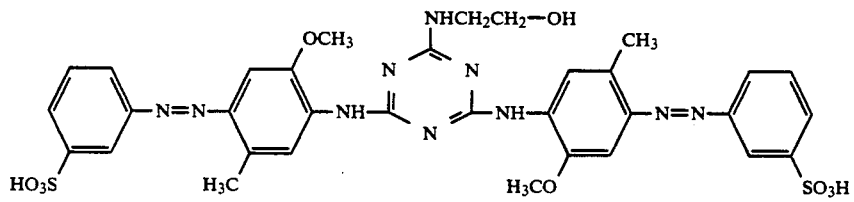

and dyes cotton and viscose in pure yellow shades having good light and wet fastness properties.

EXAMPLES 3–27

The procedure described in Examples 1 and 2 is repeated to prepare the dyes of the general formula

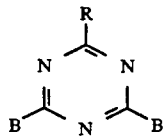

listed in Table 1, which dye cellulose materials in the stated shade with good all round fastness properties.

TABLE 1

| Example No. | B | R | Shade on cotton |
|---|---|---|---|
| 3 | ![B structure with SO3H-phenyl-N=N-phenyl(OCH3)(CH3)-NH-] | —N(morpholine)O | yellow |
| 4 | ![B structure with phenyl(SO3H)-N=N-phenyl(OCH3)(CH3)-NH-] | —N(morpholine)O | orange |

TABLE 1-continued

| Example No. | B | R | Shade on cotton |
|---|---|---|---|
| 5 | 3-HO₃S-C₆H₄-N=N-(2,5-diMe-4-NH-phenyl) | —N(CH₂CH₂OH)₂ | greenish yellow |
| 6 | 3-HO₃S-C₆H₄-N=N-(2,5-diOMe-4-NH-phenyl) | morpholino | golden yellow |
| 7 | 4-HO₃S-C₆H₄-N=N-(5-OMe-2-Me-4-NH-phenyl) | morpholino | golden yellow |
| 8 | 4-HO₃S-C₆H₄-N=N-(2,5-diOMe-4-NH-phenyl) | morpholino | orange |
| 9 | 4-HO₃S-C₆H₄-N=N-(2,5-diMe-4-NH-phenyl) | —N(CH₂CH₂OH)₂ | yellow |
| 10 | 4-HO₃S-3-Me-C₆H₃-N=N-(5-OMe-2-Me-4-NH-phenyl) | —Cl | golden yellow |
| 11 | 4-HO₃S-3-Me-C₆H₃-N=N-(5-OMe-2-Me-4-NH-phenyl) | morpholino | golden yellow |
| 12 | 4-HO₃S-3-Me-C₆H₃-N=N-(5-OMe-2-Me-4-NH-phenyl) | —NHCH₂COOH | golden yellow |

TABLE 1-continued

| Example No. | B | R | Shade on cotton |
|---|---|---|---|
| 13 | HO₃S—C₆H₂(CH₃)—N=N—C₆H(OCH₃)(OCH₃)—NH— (2-CH₃, 4-SO₃H on left ring; 2,5-OCH₃ on right ring) | —N(CH₂CH₂OH)₂ | orange |
| 14 | HO₃S—C₆H₂(CH₃)—N=N—C₆H(CH₃)(CH₃)—NH— (2-CH₃, 4-SO₃H; 2,5-dimethyl) | —N(CH₂CH₂OH)₂ | yellow |
| 15 | H₃C—C₆H₃(SO₃H)—N=N—C₆H(CH₃)(CH₃)—NH— | morpholino | greenish yellow |
| 16 | C₆H₄(SO₃H)—N=N—C₆H₂(CH₃)(NHCOCH₃)—NH— | morpholino | yellow |
| 17 | CH₃CONH—C₆H₃(SO₃H)—N=N—C₆H(OCH₃)(OCH₃)—NH— | —N(CH₂CH₂OH)₂ | scarlet orange |
| 18 | HO₃S—C₆H₄—N=N—C₆H₂(CH₃)(NHCOCH₃)—NH— | —N(CH₂CH₂OH)₂ | golden yellow |
| 19 | CH₃CONH—C₆H₃(SO₃H)—N=N—C₆H(CH₃)(CH₃)—NH— | morpholino | yellow |
| 20 | HO₃S—C₆H₄—N=N—C₆H₂(OCH₃)(NHCOCH₃)—NH— | morpholino | orange |

TABLE 1-continued

| Example No. | B | R | Shade on cotton |
|---|---|---|---|
| 21 | 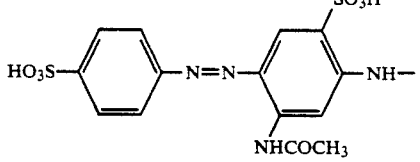 | —N(CH$_2$CH$_2$OH)$_2$ | greenish yellow |
| 22 | 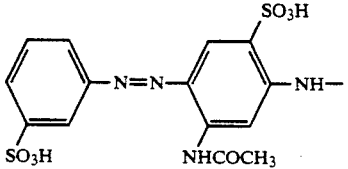 | 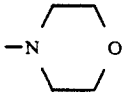 morpholine | greenish yellow |
| 23 | 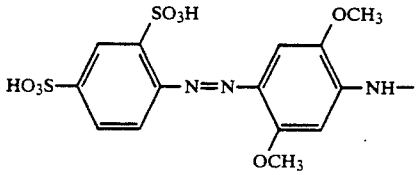 | morpholine | brownish orange |
| 24 | 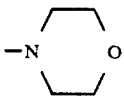 | morpholine | golden yellow |
| 25 | 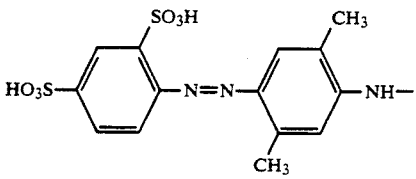 | morpholine | yellow |
| 26 | 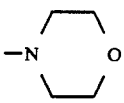 | —N(CH$_2$CH$_2$OH)$_2$ | golden yellow |
| 27 | 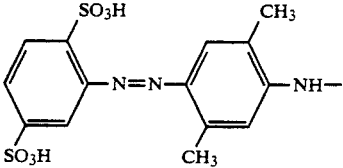 | morpholine | scarlet |

EXAMPLE 28

5.5 parts of cyanuric chloride are introduced in 50 parts of acetone and 300 parts of ice-water, 9.6 parts of the aminoazo dye of the formula

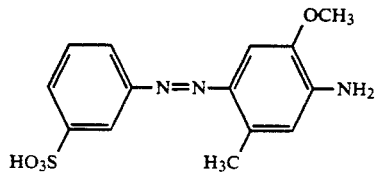

in 300 parts of water are added at a temperature of from 0° to 5° C. and at pH 7. The mixture is subsequently stirred at from 0° to 10° C. for 3 hours while the pH is maintained at from 6.5 to 7.0 with sodium hydroxide solution. Then 7.7 parts of the aminoazo dye of the formula

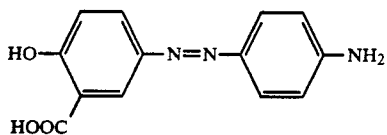  (12)

in 100 ml of water at pH 7.0 are added to the above reaction mixture. This is followed by approximately 6 hours' stirring at a temperature of from 40° to 50° C. and at pH 5, kept constant with sodium hydroxide solution. The product is then salted out, filtered off, washed with 20% sodium chloride solution and dried; it conforms in the form of the free acid to the formula

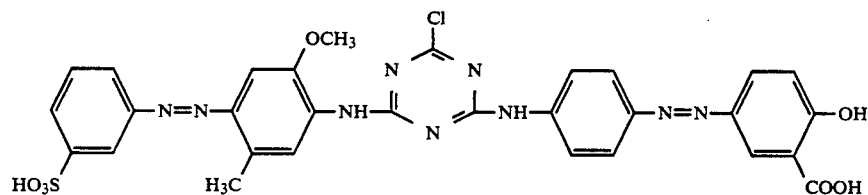

and dyes cotton in pure greenish yellow shades having good all round fastness properties.

EXAMPLE 29

10.3 parts of the monochloro compound obtained as described in Example 28 are suspended in 200 parts of water and, after 2.0 parts of morpholine have been added, heated to about 95° C. Stirring is continued at that temperature for 6 hours while the pH is maintained at 7.5 with sodium hydroxide solution. Then the product is precipitated with sodium chloride and ethanol, filtered off, washed with sodium chloride solution and dried; it conforms in the form of the free acid to the formula

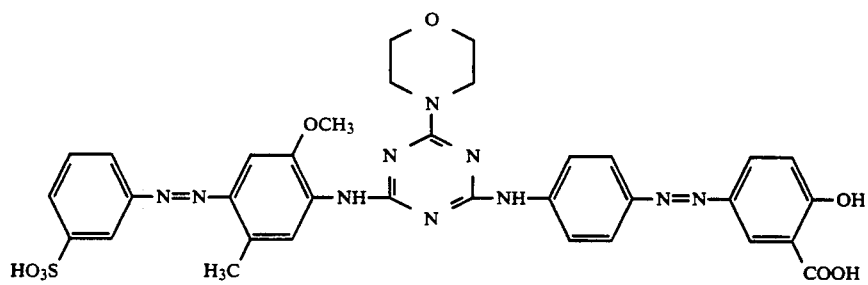

and dyes cotton in pure greenish yellow shades having good all round fastness properties.

EXAMPLES 30–34

The procedure described in Examples 28 and 29 is followed, except that the aminoazo dye of the formula (12) is replaced by an equivalent amount of the aminoazo dyes mentioned in Table 2, likewise affording useful dyes which dye cotton in a yellow or orange shade having good all round fastness properties.

TABLE 2

| Example No. | Aminoazo dye |
|---|---|
| 30 | |
| 31 | |
| 32 | |
| 33 | |
| 34 | 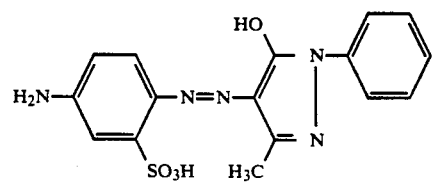 |

EXAMPLE 35

4.6 parts of cyanuric chloride are introduced in 50 parts of acetone and 300 parts of ice-water, and 8.5 parts of the aminoazo dye of the formula

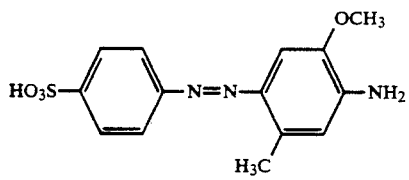

in 300 parts of water are added at from 0° to 5° C. and pH 7. The mixture is subsequently stirred at from 0° to 10° C. for 3 hours during which the pH is kept constant at 7.0 with sodium hydroxide solution. Then 4.6 parts of 4,4'-diaminostilbene-2,2'-disulfonic acid, in a neutral solution in 50 parts of water, are added, and the reaction mixture is warmed to about 40° C. and stirred at from 40° to 50° C. for 6 hours while the pH is kept constant at 7 with sodium hydroxide solution. 3.3 parts of morpholine are then added, and the mixture is heated to 95° C. and stirred at that temperature at pH 7.5 for 4 hours. The dye is salted out with sodium chloride, filtered off, washed and dried; it conforms in the form of the free acid to the formula

EXAMPLE 36

115.5 g of 4-aminoazobenzene-3,4'-disulfonic acid (80%) are dissolved in a mixture of water and concentrated HCl and diazotised in a conventional manner with 125 ml of 4N sodium nitrite solution. The diazonium salt solution is slowly added dropwise with ice-cooling to a solution of 30.3 g of 2,5-dimethylaniline in N,N-dimethylformamide and the pH is held constant during the coupling at from 4.8 to 5 with sodium acetate. The mixture is stirred overnight, and then the precipitated product of the formula

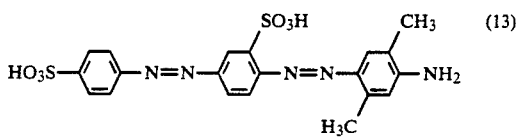

is filtered off.

Replacing 2,5-dimethylaniline by an equivalent amount of 2-methoxy-5-methylaniline, 2,5-dimethoxyaniline or 2-methoxy-5-acetylaminoaniline gives similar disazo compounds.

EXAMPLE 37

1.9 g of cyanuric chloride are dissolved in a little acetone and the solution is discharged onto ice. The fine

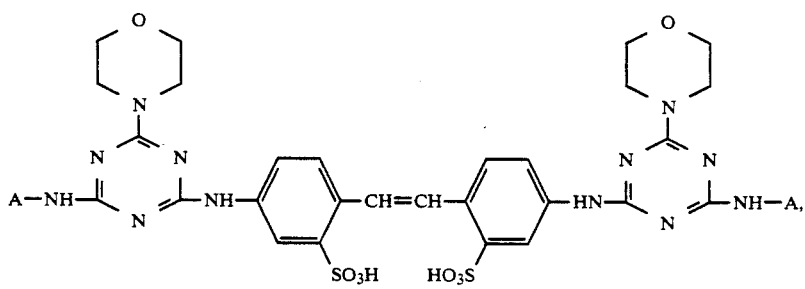

where A is the radical of the formula

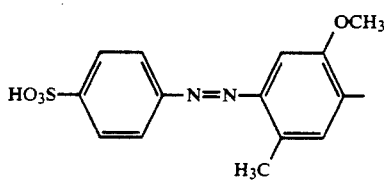

and dyes cotton in yellowish orange shades having good all round fastness properties.

cyanuric chloride suspension thus obtained is added to a solution of 5.0 g of the compound of the formula (13) prepared as described in Example 36, in 200 ml of water. The condensation is carried out at a temperature of from 0° to 5° C. and the pH is maintained at a constant 4.5 with sodium hydroxide solution.

To the resulting dichlorotriazine condensate (verification by means of HPLC) is then added an aqueous solution containing 0.55 g of 1,4-phenylenediamine, and the condensation is completed at room temperature at pH 7.

This is followed by a 3rd condensation with 1.74 g of morpholine at about 80° C., which takes about 3 hours. Thereafter the dye, which in the form of the free acid conforms to the formula

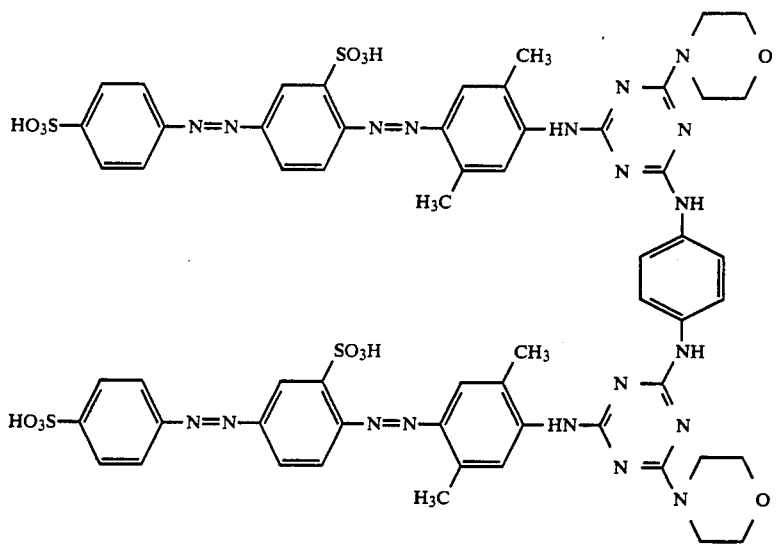

is isolated by salting out. It is obtained as a brown powder which dyes cotton in brownish orange shades having good all round fastness properties.

EXAMPLES 38–51

The procedure described in Example 37 is repeated to prepare the dyes of the general formula

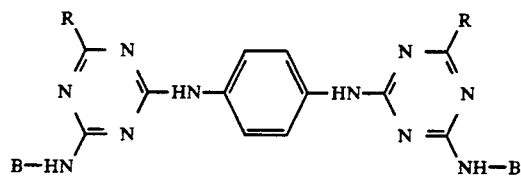

listed in Table 3, which dye cellulose materials in the stated shade with good all round fastness properties.

TABLE 3

| Example No. | B | R | Shade on cotton |
|---|---|---|---|
| 38 | HO₃S—⟨⟩—N=N—⟨SO₃H⟩—N=N—⟨CH₃/H₃C⟩ | —N(CH₂CH₂OH)₂ | brownish ochre |
| 39 | HO₃S—⟨⟩—N=N—⟨SO₃H⟩—N=N—⟨CH₃/H₃C⟩ | —NH—CH₂—COOH | brownish ochre |
| 40 | HO₃S—⟨⟩—N=N—⟨SO₃H⟩—N=N—⟨CH₃/H₃C⟩ | —HN—⟨⟩ | brownish ochre |
| 41 | HO₃S—⟨⟩—N=N—⟨SO₃H⟩—N=N—⟨CH₃/H₃C⟩ | —NH—CH₂—CH₂—OH | brownish ochre |

TABLE 3-continued

| Example No. | B | R | Shade on cotton |
|---|---|---|---|
| 42 | HO₃S–C₆H₄–N=N–C₆H₂(SO₃H)–N=N–C₆H₂(OCH₃)(CH₃)– | –N(morpholine)O | reddish brown |
| 43 | HO₃S–C₆H₄–N=N–C₆H₂(SO₃H)–N=N–C₆H₂(OCH₃)(CH₃)– | –N(CH₂CH₂OH)₂ | reddish brown |
| 44 | HO₃S–C₆H₄–N=N–C₆H₂(SO₃H)–N=N–C₆H₂(OCH₃)(CH₃)– | –NH–CH₂–CH₂–OH | reddish brown |
| 45 | HO₃S–C₆H₄–N=N–C₆H₂(SO₃H)–N=N–C₆H₂(OCH₃)(CH₃)– | –HN–C₆H₅ | reddish brown |
| 46 | HO₃S–C₆H₄–N=N–C₆H₂(SO₃H)–N=N–C₆H₂(OCH₃)(NHCOCH₃)– | –N(morpholine)O | reddish brown/ bordeaux |
| 47 | HO₃S–C₆H₄–N=N–C₆H₂(SO₃H)–N=N–C₆H₂(OCH₃)(NHCOCH₃)– | –NH–CH₂–COOH | reddish brown/ bordeaux |
| 48 | HO₃S–C₆H₄–N=N–C₆H₂(SO₃H)–N=N–C₆H₂(OCH₃)(NHCOCH₃)– | –HN–C₆H₅ | reddish brown/ bordeaux |
| 49 | HO₃S–C₆H₄–N=N–C₆H₂(SO₃H)–N=N–C₆H₂(OCH₃)(NHCOCH₃)– | –NH–CH₂–CH₂–OH | reddish brown/ bordeaux |

TABLE 3-continued

| Example No. | B | R | Shade on cotton |
|---|---|---|---|
| 50 | 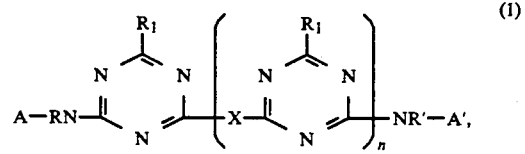 | —N(CH$_2$CH$_2$OH)$_2$ | reddish brown/ bordeaux |
| 51 | 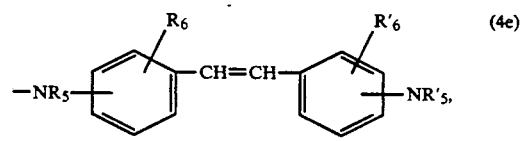 | —NH—CH$_2$—COOH | reddish brown |

Dyeing method 1

10 parts of cotton fabric (bleached and mercerised) are introduced at about 30° C. into a dyebath which contains 200 parts of water and 0.35 part of the dye of Example 3. The liquor is heated over 30 minutes to 95° C. and left at that temperature for 15 minutes. Then 4 parts of sodium sulfate are added, and the dyeing is continued at 95° C. for a further 45 minutes. Then the dyebath is cooled down over 15 minutes to 80° C. and left at that temperature for 15 minutes. The dyeing is then thoroughly rinsed with cold water and dried.

Dyeing method 2

10 parts of a polyester/cotton fibre blend are introduced at about 50° C. into a dyebath which contains 200 parts of water, a dye mixture consisting of 0.2 part of C.I. Disperse Yellow 99, 0.2 part of C.I. Disperse Blue 60, 0.2 part of C.I. Direct Blue 199 and 0.2 part of the dye of Example 3, 0.4 part of ammonium sulfate and 0.2 part of an anionic dispersant (e.g. a formaldehyde condensation product of naphthalenesulfonic acid). The dyebath is adjusted to pH 5.5 with formic acid, 1 part of sodium sulfate is added, and the dyebath is then heated up to about 130° C. in the course of 45 minutes. The dyeing is continued at 130° C. for a further 45 minutes, and then the dyebath is cooled down over 30 minutes to about 80° C. and left at that temperature for a further 45 minutes. The dyeing is then thoroughly rinsed with cold water and dried.

Dyeing method 3

The procedure of dyeing method 1 or 2 is repeated, except that on completion of the dyeing process the rinsed dyeing is introduced into a fresh bath at about 30° C. containing 200 parts of water and 0.2-0.6 part of a cationic aftertreatment agent (amine-formaldehyde-dicyandiamide condensation product or preparation based on dicyandiamide and diethylenetriamine). The dyeing is aftertreated at 30° C. for 30 minutes and then dried without a further rinsing process; the dyeing obtained has improved wet fastness properties.

Dyeing method 4

The procedure of dyeing method 1 or 2 is repeated, except that on completion of the dyeing process the rinsed dyeing is introduced into a fresh bath at about 25° C. which contains 200 parts of water, 1 part of sodium sulfate and 0.6 part of a fibre-reactive cationic aftertreatment agent based on N-methyldialkylamine and epichlorohydrin. The temperature is raised to 40° C. in the course of 15 minutes, 0.8 part of 30% sodium hydroxide solution is added, and the dyeing is treated at 40° C. for a further 45 minutes. The dyeing is finally rinsed hot and dried; it has improved wet fastness properties.

What is claimed is:

1. A compound of the formula

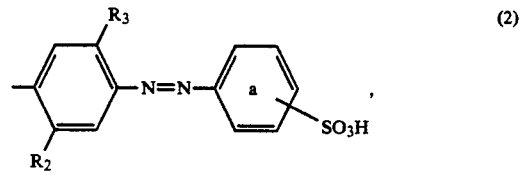

where

R and R' are each independently of the other hydrogen or C$_1$-C$_4$alkyl,

R$_1$ is chlorine, hydroxyl-substituted (in the alkyl moiety) N-mono- or N,N-di-C$_1$-C$_4$alkylamino, or morpholino, X is a bridge member of the formula where R$_5$ and R'$_5$ are each independently of the other hydrogen or C$_1$-C$_4$alkyl and R$_6$ and R'$_6$ are each independently of the other hydrogen, sulfo, methyl, methoxy or chlorine, n is 0 or 1, A is a radical of the formula where R$_2$ and R$_3$ are each independently of the other C$_1$-C$_4$alkyl, C$_1$-C$_4$alkoxy or unsubstituted or hydroxyl-substituted (in the alkyl moiety) C$_2$-C$_4$alkanoylamino and the phenyl radical (a) contains no further substituents or is further substituted by C$_1$-C$_4$alkyl, C$_1$-C$_4$alkoxy, halogen, hydroxyl, carboxyl, unsubstituted or hydroxyl-substituted $C_2$-$C_4$alkanoylamino or unsubstituted or sulfo-, $C_1$-$C_4$alkyl-, $C_1$-$C_4$alkoxy-, halogen- or hydroxyl-substituted 1- or 2-napthylazo or phenylazo, A' has the meaning A or is a radical of the formula

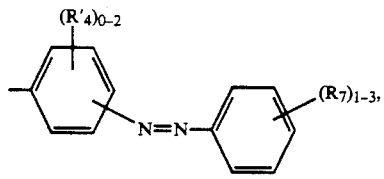

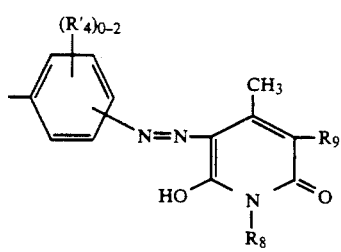

or

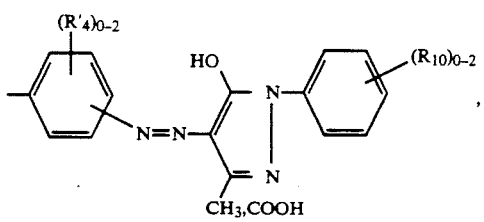

where
- $(R'_4)_{0-2}$ represents from 0 to 2 identical or different radicals selected from the group consisting of methyl, methoxy, sulfo, chlorine, hydroxyl and carboxyl,
- $(R_7)_{1-3}$ represents from 1 to 3 identical or different substituents selected from the group consisting of sulfo, methyl, methoxy, chlorine and o-, m- or p-sulfophenylazo,
- $R_8$ is hydrogen, $C_1$-$C_4$alkyl or $C_1$-$C_4$alkoxy-$C_1$-$C_4$alkyl,
- $R_9$ is sulfomethyl, cyano or carbamoyl, and
- $(R_{10})_{0-2}$ represents from 0 to 2 identical or different radicals selected from the group consisting of methyl, methoxy, sulfo, hydroxyl, amino, acetylamino and hydroxyacetylamino.

2. A compound according to claim 1, wherein R and R' are each hydrogen.

3. A compound according to claim 1, wherein $R_1$ is N-β-hydroxyethylamino, N,N-di-β-hydroxyethylamino or morpholino.

4. A compound according to claim 1, wherein n is 1.

5. A compound according to claim 1, wherein n is 0.

6. A compound according to claim 1, wherein $R_2$ and $R_3$ are each independently of the other methyl, ethyl, methoxy, ethoxy, acetylamino, propionylamino or hydroxyacetylamino.

7. A compound according to claim 1, wherein $R_2$ and $R_3$ are each independently of the other methyl, methoxy, or acetylamino.

8. A compound according to claim 1, wherein $R_2$ is methoxy and $R_3$ is methyl.

9. A compound according to claim 1, wherein the phenyl radical (a) is unsubstituted or further substituted by $C_1$-$C_4$alkyl, $C_1$-$C_4$alkoxy, chlorine, hydroxyl, carboxyl, $C_2$-$C_3$alkanoylamino and/or unsubstituted or sulfo-, methyl-, methoxy- and/or chlorine-substituted phenylazo.

10. A compound according to claim 1, wherein the phenyl radical (a) is unsubstituted or further substituted by methyl, methoxy, acetylamino or chlorine.

11. A compound according to claim 1, wherein A and A' and R and R' are each identical.

12. A compound according to claim 1 of the formula

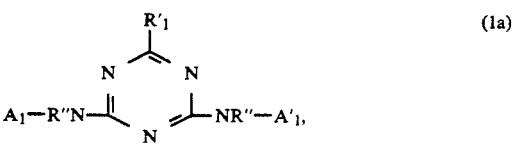

(1a)

where R" is hydrogen, methyl or ethyl, $R'_1$ is hydroxyl-substituted (in the alkyl moiety) N-mono- or N,N-di-$C_1$-$C_4$alkylamino or morpholino, $A_1$ is a radical of the formula

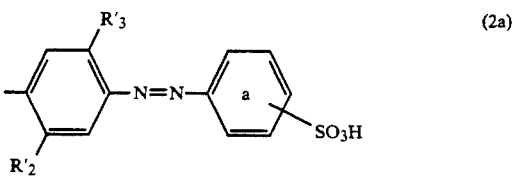

(2a)

where $R'_2$ and $R'_3$ are each independently of the other methyl, ethyl, methoxy, ethoxy, acetylamino, propionylamino or hydroxyacetylamino, and the phenyl radical (a) is as defined in claim 1, and $A'_1$ has the meaning $A_1$ or is a radical of the formula

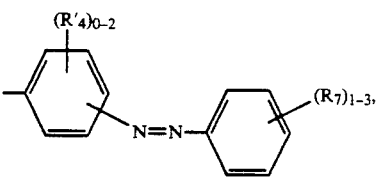

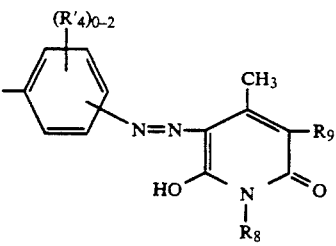

or

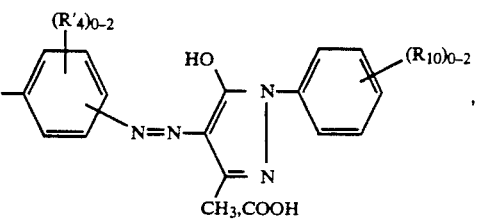

where $(R'_4)_{0-2}$, $(R_7)_{1-3}$, $R_8$, $R_9$ and $(R_{10})_{0-2}$ are each as defined in claim 1.

13. A compound according to claim 12, wherein $A_1$ and $A'_1$ are identical.

14. A compound according to claim 1 of the formula

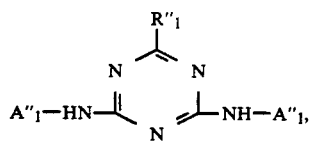 (1b)

where $R''_1$ is hydroxyl-substituted (in the alkyl moiety) N-mono- or N,N-di-$C_1$-$C_2$alkylamino or morpholino, and $A''_1$ is a radical of the formula

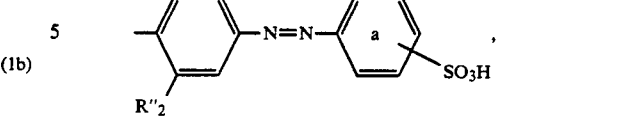 (2b)

where $R''_2$ and $R''_3$ are each independently of the other methyl, methoxy or acetylamino, and the phenyl radical (a) is unsubstituted or further substituted by $C_1$-$C_4$alkyl, $C_1$-$C_4$alkoxy, chlorine, hydroxyl, carboxyl, $C_2$-$C_3$alkanoylamino or unsubstituted or sulfo-, methyl-, methoxy- or chlorine-substituted phenylazo.

15. A compound according to claim 1 of the formula

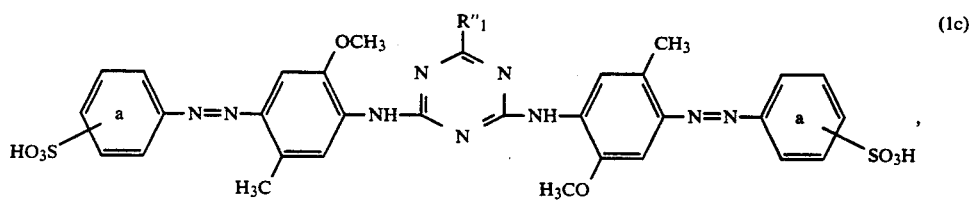 (1c)

where $R''_1$ is N-$\beta$-hydroxyethylamino, N,N-di-$\beta$-hydroxyethylamino or morpholino, and the phenyl radical is unsubstituted or further substituted by methyl, methoxy, acetylamino or chlorine.

* * * * *